US009143861B2

(12) United States Patent
Schul

(10) Patent No.: US 9,143,861 B2
(45) Date of Patent: *Sep. 22, 2015

(54) WIRELESS AUDIO PLAYER AND SPEAKER SYSTEM

(71) Applicant: Imation Corp., Oakdale, MN (US)

(72) Inventor: Eran Schul, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 366 days.

This patent is subject to a terminal disclaimer.

(21) Appl. No.: 13/737,365

(22) Filed: Jan. 9, 2013

(65) Prior Publication Data

US 2013/0177186 A1   Jul. 11, 2013

Related U.S. Application Data

(60) Provisional application No. 61/584,609, filed on Jan. 9, 2012.

(51) Int. Cl.
| | |
|---|---|
| *H04R 5/02* | (2006.01) |
| *H04R 5/00* | (2006.01) |
| *H04R 5/04* | (2006.01) |
| *H04R 27/00* | (2006.01) |
| *H04R 1/28* | (2006.01) |
| *H04R 29/00* | (2006.01) |
| *H02J 5/00* | (2006.01) |
| *H02J 7/02* | (2006.01) |
| *H02J 7/00* | (2006.01) |

(52) U.S. Cl.
CPC .. *H04R 5/00* (2013.01); *H04R 5/04* (2013.01); *H04R 27/00* (2013.01); *H02J 5/005* (2013.01); *H02J 7/025* (2013.01); *H02J 2007/0062* (2013.01); *H04R 1/2834* (2013.01); *H04R 29/008* (2013.01); *H04R 2227/005* (2013.01); *H04R 2420/07* (2013.01); *H04R 2430/01* (2013.01)

(58) Field of Classification Search
CPC ............. H04B 1/082; H04R 5/02; H04S 3/00
USPC ........................................................ 381/300
See application file for complete search history.

(56) References Cited

U.S. PATENT DOCUMENTS

| | | |
|---|---|---|
| 2,544,742 A | 3/1951 | Volf |
| 3,725,583 A | 4/1973 | Gunderson et al. |
| D230,194 S | 1/1974 | Buckler |
| 4,179,585 A | 12/1979 | Herrenschmidt |
| D268,673 S | 4/1983 | Iijima |
| 4,418,243 A | 11/1983 | Fixler |
| D361,071 S | 8/1995 | Mark |
| 5,502,772 A | 3/1996 | Felder |

(Continued)

OTHER PUBLICATIONS

Filing Receipt for U.S. Appl. No. 61/569,806, filed Dec. 13, 2011.

(Continued)

*Primary Examiner* — Simon King
(74) *Attorney, Agent, or Firm* — Dorsey & Whitney LLP

(57) ABSTRACT

The present disclosure relates to an audio player and speaker system, and particularly, to a wireless audio player and speaker system. More particularly, the present disclosure relates to a portable, rechargeable, wireless boombox-style audio player, for playing audio from an external audio source, and including a wireless charging element for wirelessly recharging an external media device.

20 Claims, 18 Drawing Sheets

(56) References Cited

U.S. PATENT DOCUMENTS

| | | |
|---|---|---|
| D444,457 S | 7/2001 | Kuo |
| D461,187 S | 8/2002 | Andre et al. |
| D476,308 S | 6/2003 | Bhavnani |
| D527,722 S | 9/2006 | Yeh |
| D535,942 S | 1/2007 | Kim |
| 7,212,110 B1 | 5/2007 | Martin et |
| D551,652 S | 9/2007 | Nakamura |
| D552,053 S | 10/2007 | Kim |
| D571,356 S | 6/2008 | Smith |
| D575,766 S | 8/2008 | Harris |
| D578,510 S | 10/2008 | Tanaka |
| D596,156 S | 7/2009 | Morisawa |
| D607,283 S | 1/2010 | Mahan et al. |
| D610,569 S | 2/2010 | Fiebel et al. |
| 7,689,197 B2 | 3/2010 | Laude et al. |
| 7,702,952 B2 | 4/2010 | Tarra et al. |
| D617,775 S | 6/2010 | Chae et al. |
| D621,813 S | 8/2010 | Wang et al. |
| D624,527 S | 9/2010 | Ho et al. |
| D629,827 S | 12/2010 | Morenstein et al. |
| 7,953,239 B2 | 5/2011 | Decanio |
| D645,847 S | 9/2011 | Chau |
| D646,665 S | 10/2011 | Iijima |
| 8,086,332 B2 | 12/2011 | Dorogusker et al. |
| D654,473 S | 2/2012 | Paddock |
| D657,343 S | 4/2012 | Cho et al. |
| 8,180,095 B2 | 5/2012 | Zhang |
| D664,122 S | 7/2012 | Cho et al. |
| 8,391,510 B2 | 3/2013 | Vincenot |
| 2003/0231189 A1 | 12/2003 | Williams |
| 2004/0014426 A1 | 1/2004 | Moore |
| 2006/0050907 A1 | 3/2006 | Levitsky |
| 2007/0076911 A1 | 4/2007 | Schul et al. |
| 2007/0098191 A1 | 5/2007 | Wan et al. |
| 2007/0173294 A1 | 7/2007 | Hsiung |
| 2008/0025172 A1 | 1/2008 | Holden et al. |
| 2010/0046771 A1* | 2/2010 | Gregg et al. .................. 381/98 |
| 2010/0194335 A1* | 8/2010 | Kirby et al. ................... 320/108 |
| 2011/0297566 A1 | 12/2011 | Gallagher et al. |
| 2012/0051567 A1 | 3/2012 | Castor-Perry |
| 2012/0075789 A1 | 3/2012 | Decamp et al. |
| 2012/0170212 A1 | 7/2012 | Gallouzi et al. |
| 2012/0189156 A1 | 7/2012 | Leung |
| 2012/0194448 A1* | 8/2012 | Rothkopf ..................... 345/173 |
| 2012/0229380 A1 | 9/2012 | Silvester |
| 2012/0250924 A1 | 10/2012 | Nicholson et al. |
| 2012/0300962 A1 | 11/2012 | Devoto |
| 2012/0321120 A1 | 12/2012 | Han et al. |
| 2012/0325702 A1 | 12/2012 | Gallagher et al. |
| 2013/0033807 A1 | 2/2013 | Kim |
| 2013/0038634 A1 | 2/2013 | Yamada et al. |
| 2013/0058065 A1 | 3/2013 | Minaguchi et al. |
| 2013/0072265 A1 | 3/2013 | Deluca |
| 2013/0080762 A1 | 3/2013 | Cretella, Jr. et al. |
| 2013/0109253 A1 | 5/2013 | Gammon et al. |
| 2013/0178155 A1 | 7/2013 | Shulenberger |
| 2013/0178161 A1 | 7/2013 | Shulenberger |

OTHER PUBLICATIONS

Filing Receipt and application for Israeli Design Application 51531, filed Nov. 11, 2011.
Design U.S. Appl. No. 29/410,496, filed Jan. 9, 2012.
Design U.S. Appl. No. 29/410,493, filed Jan. 9, 2012.
Design U.S. Appl. No. 29/410,487, filed Jan. 9, 2012.
U.S. Appl. No. 13/737,241, filed Jan. 9, 2013.
U.S. Appl. No. 13/737,172, filed Jan. 9, 2013.

* cited by examiner

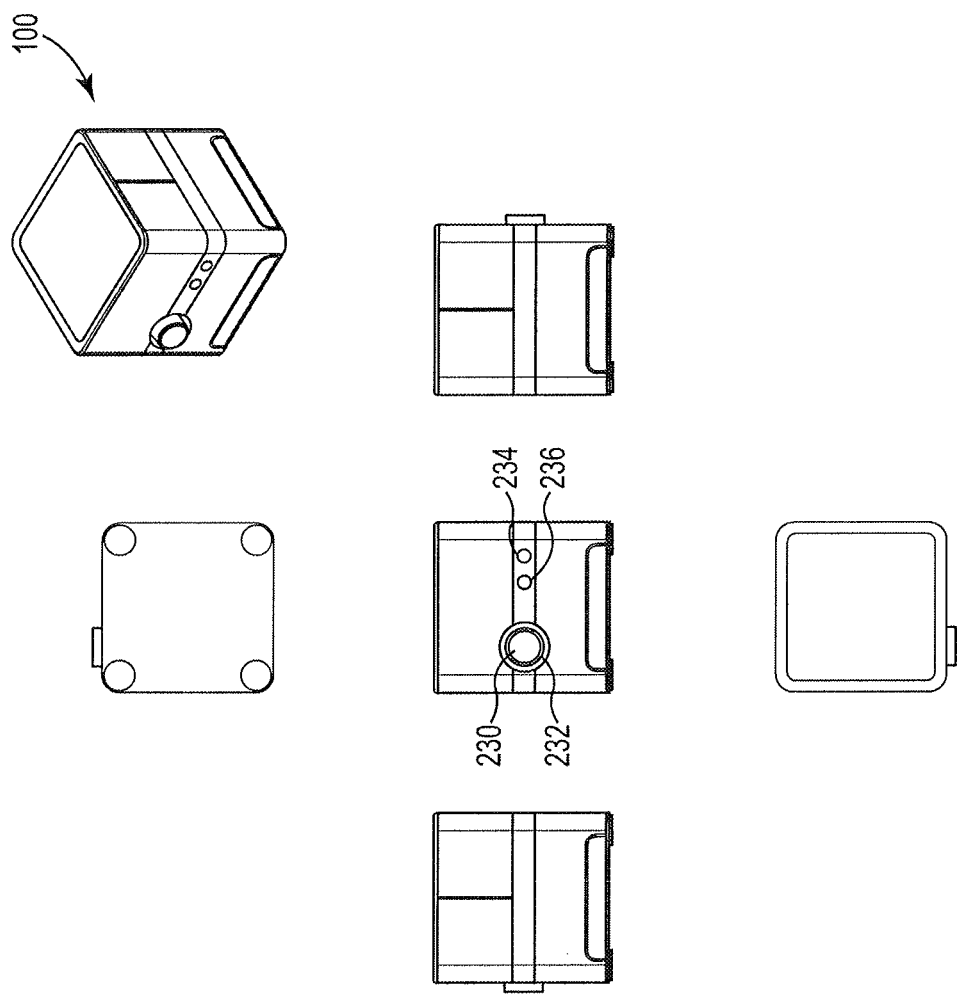

WIRELESS AUDIO PLAYER AND SPEAKER SYSTEM

CROSS-REFERENCE TO RELATED APPLICATIONS

This application claims priority to U.S. Provisional Application No. 61/584,609, filed Jan. 9, 2012, the content of which is hereby incorporated in its entirety by reference.

Inventions described in this application can also be used in combination or conjunction, or otherwise, with the subject matter described in one or more of the following:

U.S. patent application Ser. No. 13/737,172, filed Jan. 9, 2013, entitled WIRELESS AUDIO PLAYER AND SPEAKER SYSTEM, which claims priority to U.S. Provisional Application 61/584,605, filed Jan. 9, 2012; and U.S. patent application Ser. No. 13/737,241, filed Jan. 9, 2013, now issued as U.S. Pat. No. 8,867,776, entitled AUDIO SPEAKER FRAME FOR MULTIMEDIA DEVICE, which claims priority to U.S. Provisional Application 61/584,596, filed Jan. 9, 2012.

Each and every one of these documents is hereby incorporated by reference as if fully set forth herein.

FIELD

The present disclosure relates to an audio player and speaker system, and particularly, to a wireless audio player and speaker system. More particularly, the present disclosure relates to a portable, rechargeable, wireless boombox-style audio player, for playing audio from an external audio source, and including a wireless charging element for wirelessly recharging an external media device. More particularly, the present disclosure relates to a semi-permanent, wireless boombox-style audio player, for playing audio from an external audio source.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the embodiments will be better understood from the following description taken in conjunction with the accompanying Figures, in which:

FIG. 8 includes several schematic drawings of an audio player and speaker system according to an embodiment of the present disclosure.

DETAILED DESCRIPTION

The present disclosure relates to novel and advantageous audio player and speaker systems, and particularly, to wireless audio player and speaker systems. More particularly, the present disclosure relates to novel and advantageous portable, rechargeable, wireless boombox-style audio players, for playing audio from, although not limited to, an external audio source, and including a wireless charging element for wirelessly recharging an external media device. In some embodiments, the systems are audio systems. In some embodiments, the present disclosure relates to novel and advantageous semi-permanent, wireless boombox-style audio players, for playing audio from an external audio source.

In general, an audio player and speaker system of the present disclosure may include one or more speakers and may be configured to receive and play audio from an internal audio source, such as a radio receiver, or an external audio source, such as a portable or external media player, by wired and/or wireless connection. Portable or external media players may include any type of media playback device, including audio playback devices, such as, but not limited to, an iPod or similar device, a mobile phone or smartphone device, tablet PCs, etc., as will be recognized by those skilled in the art. The audio player and speaker system may be connected to an external power source and/or may include a battery, which in some embodiments, may also be rechargeable, for example, via the external power source. The audio player and speaker system may also be configured for wirelessly recharging the portable external media player or other external device. In this regard, embodiments of the audio player and speaker system may be configured for truly wireless audio playback and charging. The audio player and speaker system may be configured for indoor and outdoor use.

Figure 1:
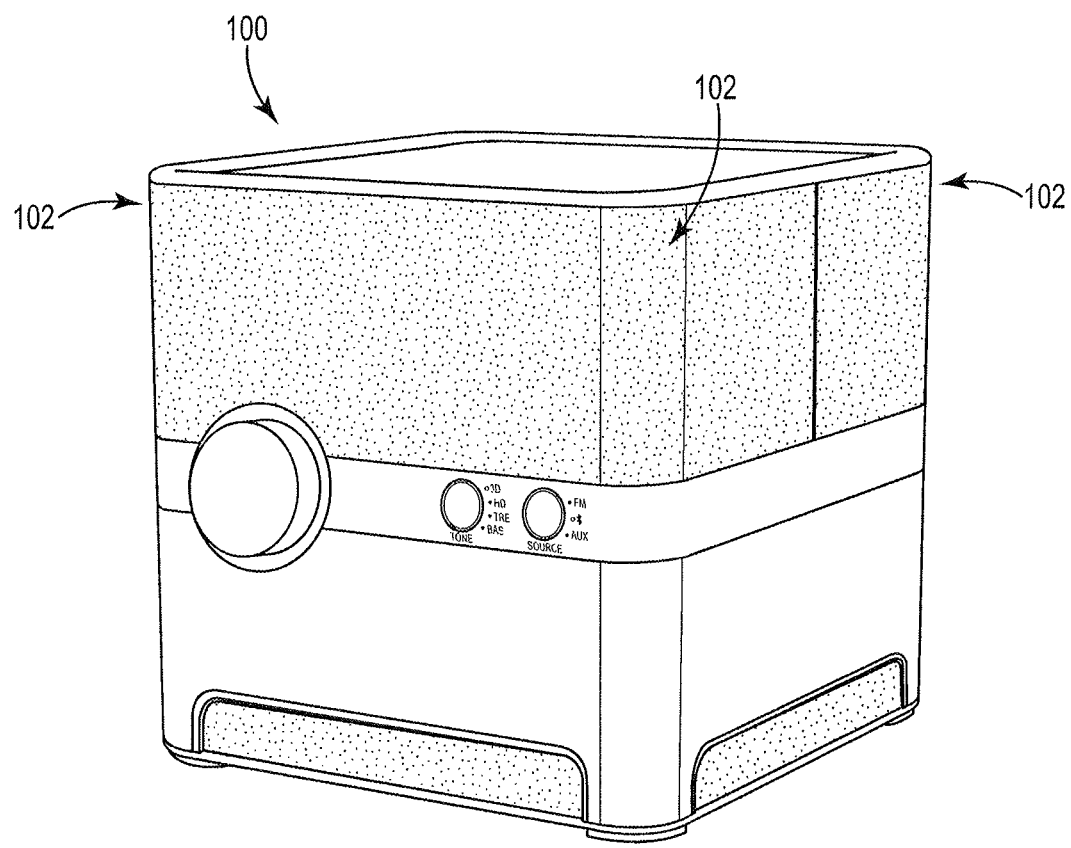
FIG. 1 is a perspective view of an audio player and speaker system according to an embodiment of the present disclosure.

FIGS. 1 and 8 illustrate one embodiment of an audio player and speaker system 100 of the present disclosure. The audio player and speaker system 100 may be or include a housing configured in any suitable shape, such as, but not limited to, cubical, as a rectangular polygon or rectangular prism, polygonal, triangular, spherical or semi-spherical, etc., each with any number of corners or edges that may be sharp or more smooth, rounded corners or edges. As illustrated, and in accordance with one embodiment, the audio player and speaker system 100 may be configured in substantially the shape of a cube with each side being generally dimensioned the same, and generally including softened or rounded edges and corners. In some embodiments, the audio player and speaker system 100 may be manufactured using water-resistant construction materials and methods. In this regard, the audio player and speaker system 100 may be suitable for indoor or outdoor use.

Figure 2:
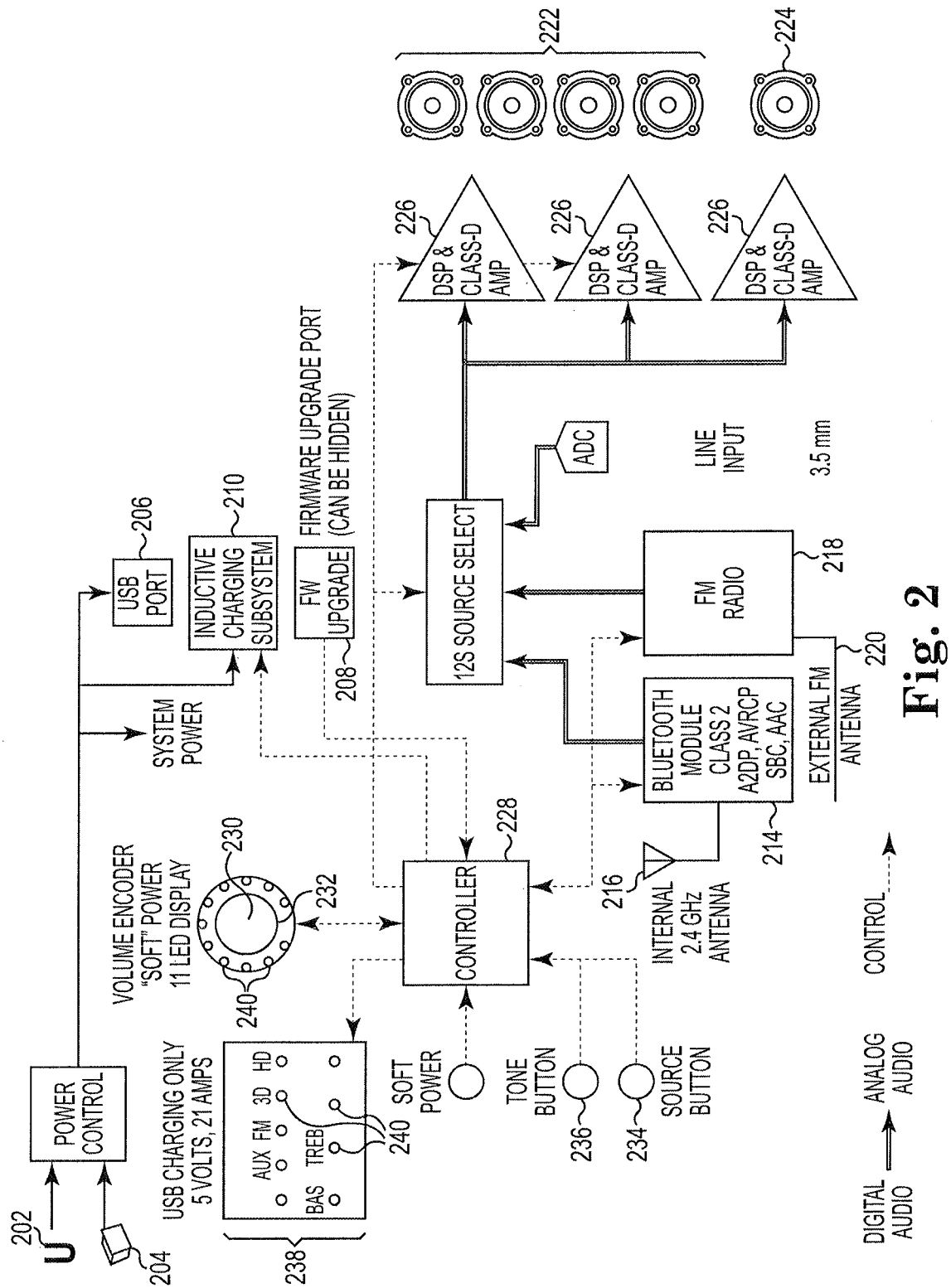
FIG. 2 is a schematic diagram of an audio player and speaker system according to an embodiment of the present disclosure.
Figure 3:
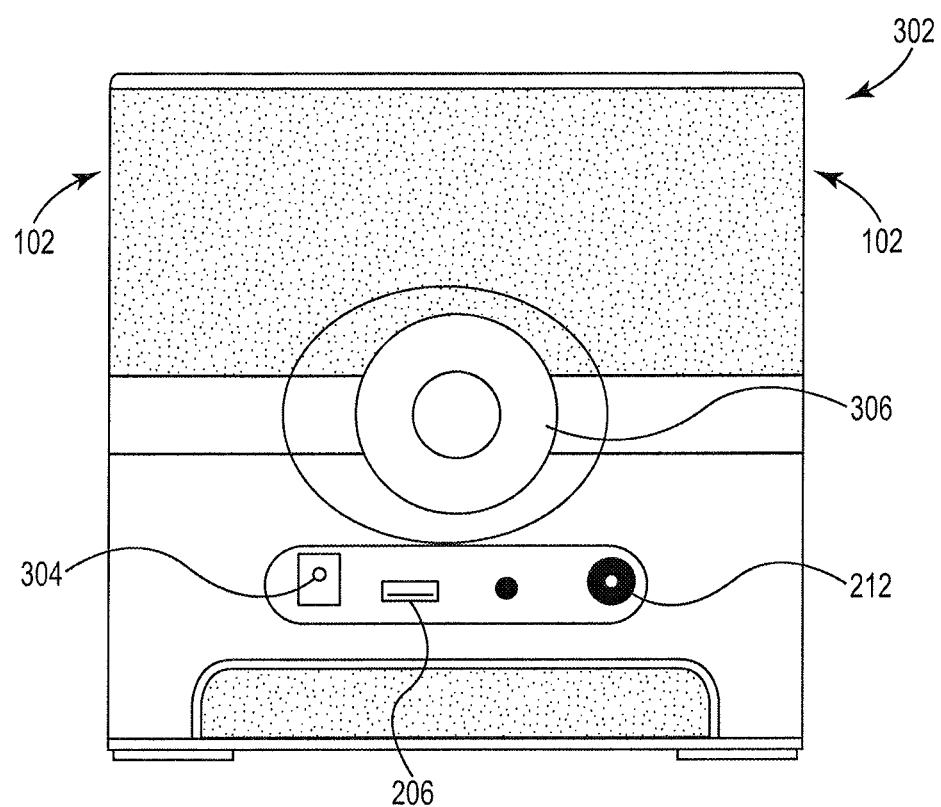
FIG. 3 is a rear panel view of an audio player and speaker system according to an embodiment of the present disclosure.

As illustrated in FIG. 2, the audio player and speaker system 100 may include an internal power source 202, which in some embodiments, may be one or more batteries. In further embodiments, the internal power source 202 may be one or more rechargeable batteries. The audio player and speaker system 100 may also be removably connected to an external power source 204, such as an AC power source for operational functions, as well as, or alternatively, for recharging the internal power source. As illustrated in FIG. 3, which shows a back panel 302 of the audio player and speaker system 100, a power adapter port 304, such as but not limited to a DC power jack, may be provided for removably connecting the audio player and speaker system via a removably connectable external power adapter to an external power source. In still other embodiments, a power cord or power adapter may be permanently or integrally connected with the audio player and speaker system 100, an opposite end of which may be connected to an external power source, such as an AC power source.

In some embodiments, the audio player and speaker 100 may also include a charging port 206 for recharging an external device, such as, but not limited to, a portable media player, a mobile phone or smartphone, etc. In some embodiments, as may be seen in FIGS. 2 and 3, the charging port 206 may be a USB port, such as a female USB port to which the external device may be removably connected via a USB connector cord. Although not limited as such, in some embodiments, the audio player and speaker system 100 may be configured such that when connected to an external power source, a higher amperage of current may be supplied through the charging port 206 to a connected external device than when the audio player and speaker system is operating solely on battery power. In additional or alternative embodiments, a charging port for external devices may be provided on an external power adapter, such as the removably connectable external power adapter discussed above.

In some embodiments, the charging port 206, such as a USB port, may be additionally configured for receiving and accepting firmware updates or upgrades. In other embodiments, a separate port 208 may be used for firmware updates or upgrades, if desired.

Figure 4:
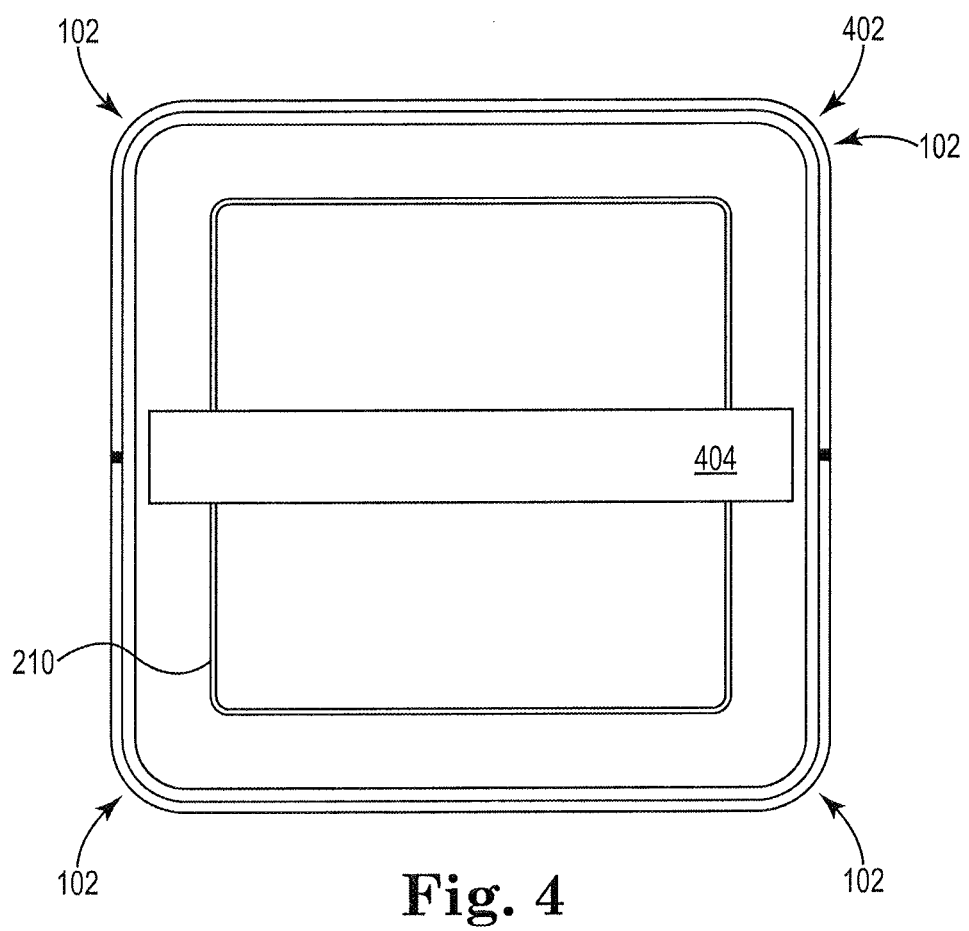
FIG. 4 is a top panel view of an audio player and speaker system according to an embodiment of the present disclosure.
Figure 5:
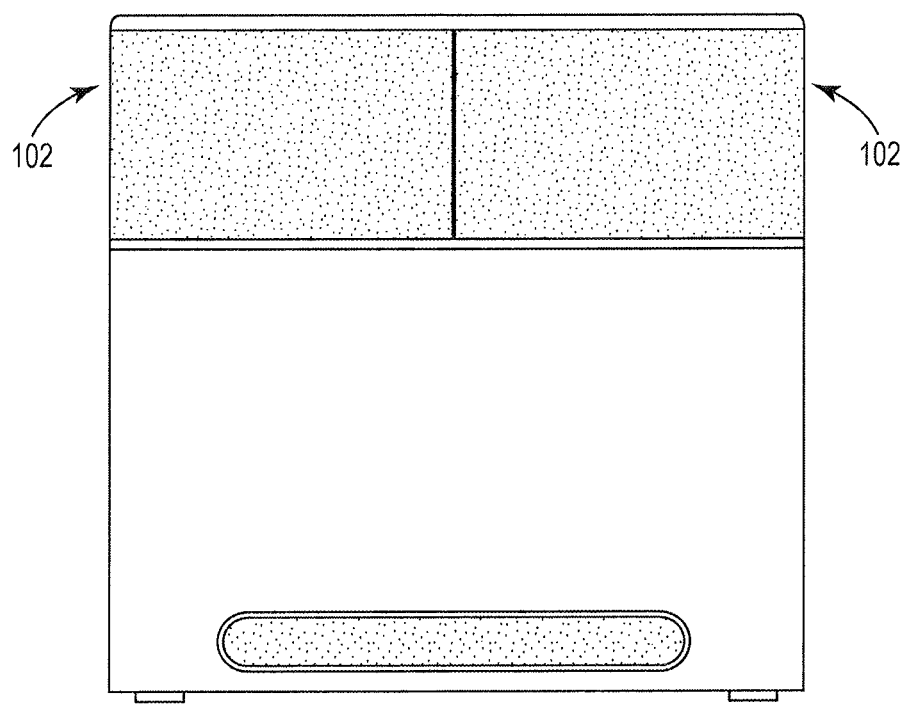
FIG. 5 is a side panel view of an audio player and speaker system according to an embodiment of the present disclosure.

In additional or alternative embodiments, the audio player and speaker system 100 may be configured for wireless recharging of an external device, where an external device includes capabilities for wireless recharging or is connected to an adapter configured with capabilities for wireless recharging. For example, the audio player and speaker system 100 may include capabilities for wireless, inductive charging, such as via a inductive charging element or system 210. For example, the audio player and speaker system 100 may include any suitable system for inductive charging or adapted from a system for inductive charging, such as, but not limited to, POWERMAT by POWERMAT, QI by ENERGIZER, inductive charging systems developed by TDK, etc. An inductive charging element 210 may be provided at any suitable location of the audio player and speaker system 100. However, in one embodiment, as illustrated in FIG. 4, which shows a top panel 402 of the audio player and speaker system 100, an inductive charging element 210 may be provided on the top panel. The inductive charging element 210 may take up any amount of desired space of the top panel 402, from the smallest amount of space required for functional operation of the inductive charging element 210 to substantially the entire top panel. In some embodiments, a transmit coil of the inductive charging element 210 may be substantially centered on the top panel 402, such that the center of the transmit coil is generally equidistant to opposing edges of the top panel; however, it is recognized that the transmit coil of the inductive charging element may be provided at any suitable location of the top panel. The transmit coil may include an alignment magnet, which may be positioned at the center of the coil. Additionally or alternatively, the top panel 402 may include a position indicator on its surface, which may facilitate user alignment of the external device with the transmit coil of the inductive charging element 210, such as for devices to be charged that do not have an alignment magnet. Any other components, such as would be recognized by those skilled in the art, may be included with the inductive charging element, such as, but not limited to, ferrite materials for constraining magnetic fields created by the transmit coil, one or more heat sinks for dissipating heat generated, etc.

In some embodiments, availability of inductive charging capabilities to the user may be limited, such as, but not limited to, for limiting power consumption of the audio player and speaker system 100. For example, when the audio player and speaker system 100 is connected to an external power source, such as an external AC power source, inductive charging capabilities may be generally continuously available, including when the audio player and speaker system is in a powered "on" state or powered "off" state. On the other hand, for example, when the audio player and speaker system 100 is operating solely from batter power, inductive charging capabilities may be limited to when the audio player and speaker system 100 is in a powered "on" state, or may be unavailable whether the audio player and speaker system 100 is powered "on" or "off." Of course, it is recognized that any variation of when inductive charging capabilities are available to the user are considered within the spirit and scope of the present disclosure, including those variations where inductive charging capabilities are not based on the powered state of the audio player and speaker system 100 and/or are based on any other characteristic or state of the audio player and speaker system.

With reference back to FIGS. 2 and 3, the audio player and speaker sound system 100 may further include an auxiliary port, or line-in port, 212 for operably connecting with an external media player to receive and play media input, such as audio input, therefrom. In one embodiment, the auxiliary port 212 may be a standard 3.5 mm stereo jack; however, any other suitable type of port may be utilized.

In additional or alternative embodiments, the audio player and speaker system 100 may be configured with capabilities for receiving wireless media or audio signals, such as, but not limited to, by short-range, wireless communications. One example of a suitable short-range, wireless communication technology is known as Bluetooth technology. Generally, Bluetooth technology is a short-range, wireless communications technology that is relatively simple and secure. It is now commonly available in a variety of devices, including mobile phones, computers, and other products. The Bluetooth Specification defines a uniform structure for devices to connect and communicate with each other. When two Bluetooth enabled devices connect to each other, this is referred to as "pairing." For example, Bluetooth pairing may include two Bluetooth enabled devices communicating with each other and establish a connection for Bluetooth communications. To pair the Bluetooth devices, a password or passkey may be exchanged, or a code may be shared by both Bluetooth devices, establishing that the devices (or their users) have agreed to a Bluetooth pairing between the devices. Enhanced authentication may be used, as appropriate.

In this regard, in one embodiment, the audio player and speaker system 100 may include an internal Bluetooth receiver module 214 and antenna 216 for receiving media or audio data from an external media source or device having Bluetooth capabilities. The Bluetooth receiver module 214 may be configured to perform Bluetooth pairing with the external media device, such as via secure simple pairing ("SSP"), as will be understood by those skilled in the art. Accordingly, the audio player and speaker system 100 may include a Bluetooth pairing mode, through which pairing between the Bluetooth receiver module 214 and the external media device may be accomplished. Once the devices are paired, the devices may automatically connect when both devices are powered "on," with Bluetooth enabled, and are in Bluetooth range. In some embodiments, the audio player and speaker system 100 may include a standby mode that may monitor for nearby Bluetooth enabled devices to which it has been paired and may automatically power "on" fully when the paired device is in range. In some embodiments, where the paired device is transmitting audio, the audio player and speaker system may also automatically begin playback received from the nearby device through the Bluetooth connection.

In additional or alternative embodiments, the audio player and speaker system 100 may include radio functionalities, such as a FM and/or AM radio 218. The audio player and speaker system 100, in some embodiments, may include an internal antenna for the radio features. However, in other embodiments, the audio player and speaker system 100 may include an attached external antenna or a port for connecting with an external antenna 220.

The audio player and speaker system 100 may include any number, type, size, and placement of speakers by which to play audio received from an external (e.g., via auxiliary port 212 or via Bluetooth) or internal (e.g., FM radio) audio source and obtain a particular sound image. While not required, in one embodiment, the audio player and speaker system 100 may be configured for at least stereo sound with left, right, and optionally subwoofer channels. In other embodiments, the system could be configured for multiple sound channels and one or more subwoofer channels. In one embodiment, as shown in FIGS. 1-6B, the audio player and speaker system 100 may include four speakers/transducers/drivers 222, with one provided at or near each upper corner 102 of the audio player and speaker system. As indicated, the speakers 222 may be any suitable size; however, in one embodiment, the speakers 222 may be around 1½ inches in diameter. The speakers 222 may be utilized for any range. However, in one embodiment, speakers 222 may be configured for a full range or a relatively higher range of frequencies. In some embodiments, the speakers 222 may each be configured as acoustically independent in its own substantially sealed enclosure. Additionally, in some embodiments, the enclosure of each speaker 222 may further include a passive radiator.

In some embodiments, the audio player and speaker system 100 may also include a larger speaker/transducer/driver 224, which may be positioned near the bottom of the audio player and speaker system, and which may be mounted in a vented enclosure. In one embodiment, the speaker 224 may be around 4 inches in diameter; however, other sizes are certainly suitable. The speaker 224 may also, in some embodiments, be utilized as a subwoofer.

In additional or alternative embodiments, the audio player and speaker system 100 may include one or more passive radiators positioned, for example, at one or more of its side surfaces. For example, the audio player and speaker system 100 may include one or more passive radiators on its left side and one or more passive radiators on its right side. Although particular speaker arrangements have been discussed, as mentioned above, it is recognized that any number, type, size, and placement of speakers may be utilized as desired. Similarly, any of the speakers or passive radiators may include speaker grill covers. The system may also include any suitable number of audio reflex ports/tubes 306 for creating a desired sound image.

The speakers may be driven utilizing any suitable number of audio amplifiers 226. In one embodiment, in conjunction with speakers 222 and 224, the amplifiers 226 may be configured to provide four full range or higher range channels and a subwoofer channel. However, it is recognized that the speakers and amplifiers may be used in any desirable configuration as desired for the application.

With reference to FIG. 2, the audio player and speaker system 100 may include a controller 228 for controlling the functions of the audio player and speaker system 100. The controller 228 may be a microprocessor or may be any other suitable combination of hardware or electric circuit components and/or software or software modules. A user interface or one or more controls may be provided to interface with the controller 228 so as to direct the controller to perform a particular function.

Figure 6A:
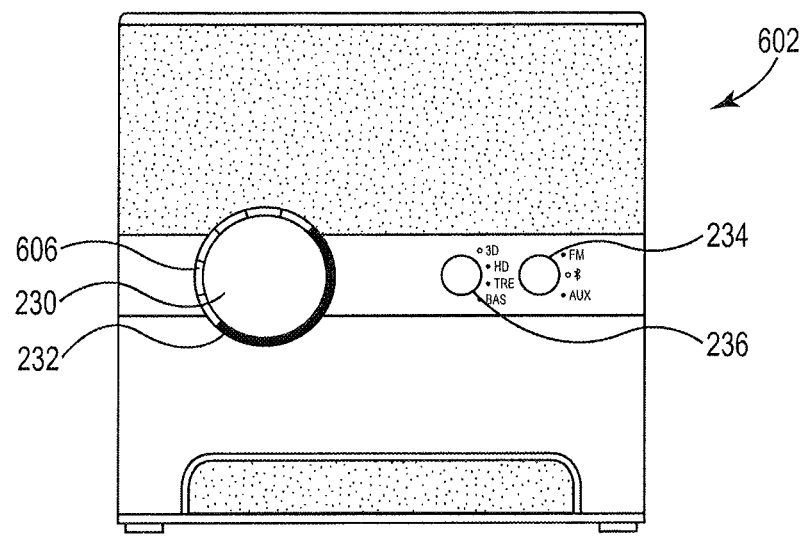
FIGS. 6A and 6B are front control panel views of an audio player and speaker system according to some embodiments of the present disclosure.
Figure 6B:
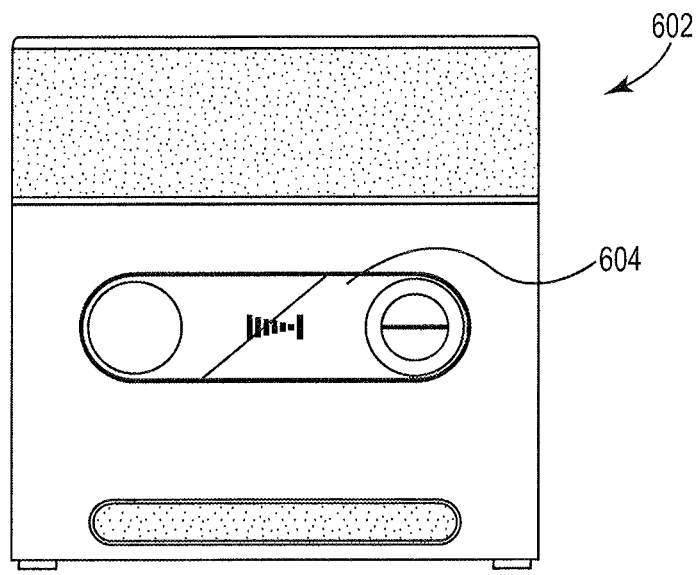

Two example interfaces having one or more controls are illustrated in FIGS. 6A and 6B. However, it is recognized that any suitable interface and/or combination of controls may be utilized, and those shown in the figures are merely for illustrative purposes to assist in description of some embodiments of the present disclosure and are not intended to be limiting. As may be seen from FIGS. 6A and 6B, for example, a front panel 602 of the audio player and speaker system 100 may comprise one or more controls, such as buttons, dials, switches, and the like, which provide an interface through which the user may interact with the audio player and speaker system.

As illustrated in FIG. 2, the audio player and speaker system 100 may include, for example, a power button 230 or other control mechanism for powering the audio player and speaker system "on" and "off." The audio player and speaker system 100 may also include a volume control mechanism 232 for controlling the volume level. In one embodiment, the volume control mechanism may be a volume control dial, the turning of which changes the volume. As illustrated in FIG.

6A, the power button 230 and volume control dial 232 may be the same control mechanism. However, in other embodiments, the power control and volume control could be separate. There may be any suitable number of volume levels, as may be desired. In one non-limiting embodiment, for example, there may be 32 or more discrete volume levels, and more preferably 64 or more discrete volume levels. The volume step size of each level need not be uniform. In another non-limiting embodiment, for example, there may be approximately 11 volume levels, such as volume levels of 0% (mute), 10%, 20%, 30%, 40%, 50%, 60%, 70%, 80%, 90%, 100%, or any variation thereof.

Figure 7A:
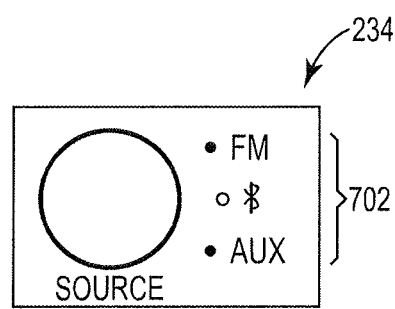
FIG. 7A is an example source selector control for an audio player and speaker system according to an embodiment of the present disclosure.

As also illustrated in FIGS. 2 and 6A, for example, the audio player and speaker system 100 may include a source selector control 234, such as, but not limited to, a source selector push button or control dial, for a user to select the audio source from which the audio player and speaker system is to receive and play audio. A detailed close-up view of one embodiment of a source selector control 234, as a source selector push button, is illustrated in FIG. 7A. A user may select an audio source, for example, by pressing on the source selector push button to toggle between two or more audio sources 702. As discussed above, in one embodiment of the audio player and speaker system 100, audio may be received and played from an external media device via auxiliary port 212, an external media device via wireless communication, such as but not limited to Bluetooth communication, and/or from radio transmission, such as FM radio. Accordingly, in one embodiment, the source selector control 234 may be used to toggle between audio received from the auxiliary port 212, via Bluetooth communication, and FM radio. In some embodiments, if the external source is Bluetooth enabled but has not yet been paired with the audio player and speaker system 100, the source selector may also be used to initiate pairing mode. In alternative embodiments, the audio player and speaker system 100 may have a separate control mechanism for initiating Bluetooth pairing mode.

In one embodiment, where FM radio is provided as an audio source selection for the audio player and speaker system 100, additional radio controls, such as, but not limited to, a tuner, may be provided at any suitable location of the audio player and speaker system. In other embodiments, basic tuning functions may be provided through an existing control mechanism, such as, but not limited to, the volume dial discussed above. A toggle mechanism, in hardware and/or software, may be provided in order to toggle the existing control mechanism (e.g., volume dial) between its original function (e.g., volume control) and a radio tuner. In additional or alternative embodiments, a mobile application, often referred to as an "app," may be provided for a user to download to the external media device, such as, but not limited to, a smartphone, through which the audio player and speaker system 100 may communicate and provide radio controls. The app may additionally provide remote control functionality for any other suitable control mechanism, such as, but not limited to, power control, volume control, source selection, speaker/tone configuration (discussed below), etc., of the audio player and speaker system 100.

Figure 7B:
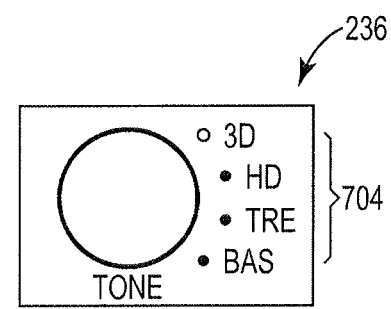
FIG. 7B is an example tone control for an audio player and speaker system according to an embodiment of the present disclosure.

As also illustrated in FIGS. 2 and 6A, for example, the audio player and speaker system 100 may include a speaker/tone configuration control 236, such as, but not limited to, a speaker/tone configuration push button or control dial, for a user to select between sound profiles/speaker configurations and/or adjust sound/tone characteristics. A detailed close-up view of one embodiment of a speaker/tone configuration control 236, as a speaker/tone configuration push button, is illustrated in FIG. 7B. A user may select between sound profiles/speaker configurations and/or adjustable sound characteristics, for example, by pressing on the speaker/tone configuration push button to toggle between the sound profiles/speaker configurations and/or adjustable sound characteristics 704.

In one non-limiting embodiment, for example, illustrated in FIG. 7B, using the speaker/tone configuration control 236, the user may be able to select between multiple sound profiles, such as a first sound profile (labeled "3D" in FIG. 7B) and a second sound profile (labeled "HD" in FIG. 7B). The first sound profile may relate to a first speaker configuration, for example but not limited to, where all full range speakers 222 are driven, and the second sound profile may relate to a speaker configuration, for example but not limited to, where only some of the full range speakers 222 are driven. Of course, any suitable number of sound profiles may be provided and each profile may relate to any suitable speaker configuration, such as, but not limited to, where some or all of the speakers are driven and others are not driven or are driven at lower power, or where the speakers are switched between mono and stereo sound.

Similarly, in one non-limiting embodiment, for example, illustrated in FIG. 7B, using the speaker/tone configuration control 236, the user may be able to select between adjustable sound characteristics. For example, the user may be able to select between treble and bass adjustment, fade adjustment, etc. Once an adjustable sound characteristic is selected, an additional control mechanism may be utilized to adjust the level of the selected sound characteristic. In one embodiment, an existing control mechanism, such as the volume control dial discussed above, may be utilized to adjust the level of the selected sound characteristic.

The audio player and speaker system 100 may also include one or more visual indicators 238 so as to provide information to the user. The visual indicators 238 may be provided by any suitable means, such as via one or more LEDs 240, one or more LCD displays 604 (see FIG. 6B), etc. Such visual indicators 238 may include, but are not limited to, any or all of the following:

Battery power indicator: a battery power indicator may be provided to indicate a level of battery power, or when battery power drops below a predetermined level. In an example embodiment, the indicator may include a single LED that turns on and/or blinks when the battery power drops below the predetermined level. However, other suitable configurations of the visual indicator are within the spirit and scope of the present disclosure.

Inductive charging indicator: an indicator may be provided to indicate when a device has been placed on the inductive charging element and/or is actively charging. In one example embodiment, the indicator may include a single LED that turns on and/or blinks when the device has been placed on the inductive charging element and/or is actively charging. However, other suitable configurations of the visual indicator are within the spirit and scope of the present disclosure.

Volume level indicator: an indicator may be provided to indicate the volume level of the audio player and speaker system. In one example embodiment, the indicator may include a plurality of aligned LEDs that indicate the volume level by how many of the LEDs are lit. In a further embodiment, the plurality of aligned LEDs may be aligned in circular or semi-circular fashion 606, and may be located near or around the volume control dial discussed above. However, other suitable configurations of the visual indicator are within the spirit and scope of the present disclosure.

Bluetooth indicator: an indicator may be provide Bluetooth status information, such as, but not limited to, whether an Bluetooth enabled external media device is nearby, paired, and/or connected, etc. In an example embodiment, the indicator may include one or a series of LEDs. However, other suitable configurations of the visual indicator are within the spirit and scope of the present disclosure.

Source indicator: an indicator may be provided to indicate the audio source selected, for example, by the source selection control. In one example embodiment, the indicator may include one or more LEDs that identify the source selected, such as illustrated in FIG. 7A. However, other suitable configurations of the visual indicator are within the spirit and scope of the present disclosure.

Speaker/tone configuration indicator: an indicator may be provided to indicate the selected speaker/tone configuration and/or adjustable sound characteristic selected for adjustment. In one example embodiment, the indicator may include one or more LEDs that identify the selected configuration or adjustable sound characteristic, such as illustrated in FIG. 7A. In a further embodiment, as discussed above, where the volume dial may be used to adjust a particular sound characteristic, the volume indicator may also be used as the level indicator for the sound characteristic being adjusted. In other embodiments, a separate level indicator may be utilized. However, other suitable configurations of the visual indicator are within the spirit and scope of the present disclosure.

In other embodiments, other types of feedback, such as, but not limited to, tactile or audio feedback, may be used to provide indications for any of the above information in addition to, or in alternative to, the visual indicators discussed above, as may be desired.

In one embodiment, the audio player and speaker system 100 may include a remote control for remotely controlling one or more of the above-described functions or other functions, as would be understood by those skilled in the art. Accordingly, the audio player and speaker system 100 may further include a wireless receiver, such as, but not limited to, an infrared receiver, for receiving signals from a remote control.

In further embodiments, the audio player and speaker system could include hands-free phone capabilities for a connected (e.g., wired or wirelessly) mobile phone or smartphone. For example, the audio player and speaker system 100, in addition to the speakers, may further include a microphone, and accordingly, a user may utilize the audio player and speaker system as a hands-free speaker phone. In still further embodiments, the audio player and speaker system could be configured with additional hands-free functionality, such as, but not limited to, voice-dialing, voice-texting, text read back, other hands-free functionality offered by the connected device, etc.

One advantage of the audio player and speaker systems described herein is that, in some embodiments, they permit truly wireless operation; no docking or docking station need be required. As discussed above, the audio player and speaker systems, in some embodiments, may wirelessly receive audio from an external media device, such as, but not limited to, a smartphone, and may also simultaneously wirelessly recharge the external media device. In some embodiments, the audio player and speaker systems may additionally be operating wirelessly on one or more batteries, such as rechargeable batteries.

In some embodiments, as illustrated in FIG. 4, the audio player and speaker system 100 may include an integral handle 404. The integral handle 404 may permit the audio player and speaker system 100 to be more conveniently portable.

The use of the inductive charging feature would, in some embodiments, desirably be configured so as to not or only slightly adversely affect other functions of the audio player and speaker system. For example, the use of the inductive charging feature would, in some embodiments, desirably be configured so as to not or only slightly adversely affect, but not limited to, the FM sensitivity, audio noise, audio frequency response, audio signal to noise ratio, and/or Bluetooth sensitivity.

Figure 9:
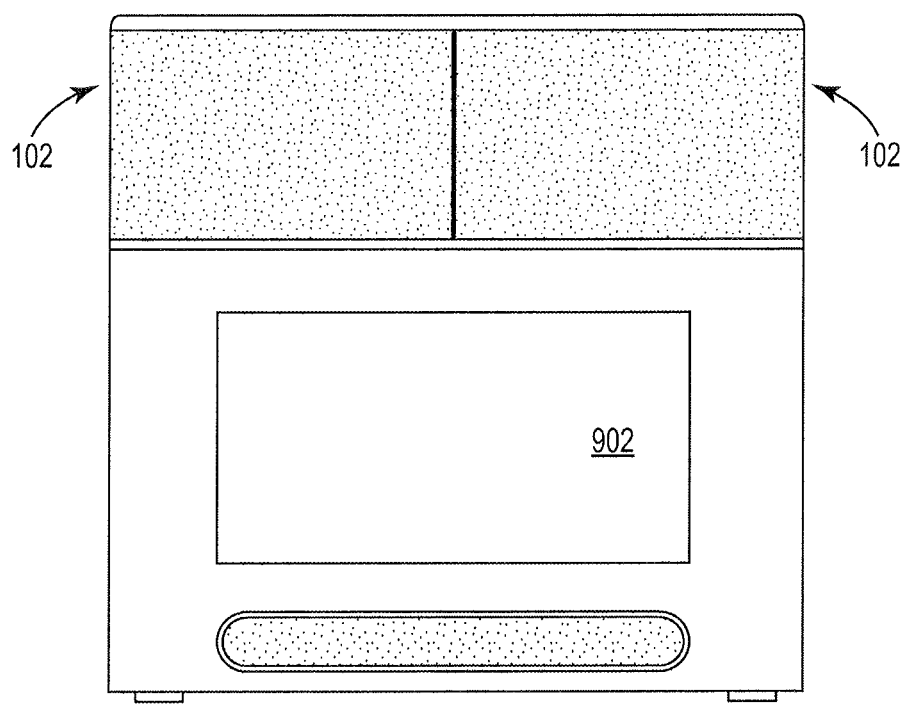
FIG. 9 is a side panel view of an audio player and speaker system with a video display screen, according to another embodiment of the present disclosure.
Figure 18:
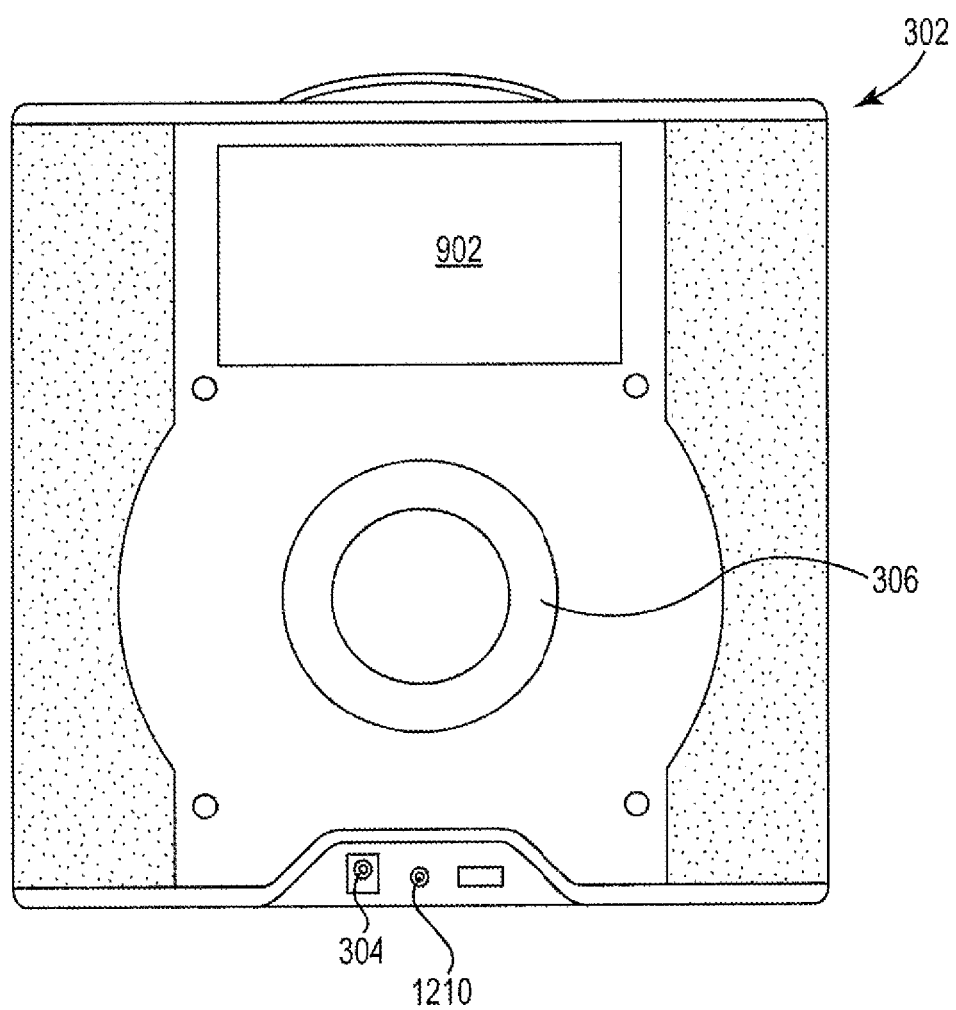
FIG. 18 is a rear panel view of an audio player and speaker system with a video display screen, according to another embodiment of the present disclosure.

In some embodiments, the systems contain a video display in addition to audio capabilities, where said video display is configured to play movies, videos, television programming, music videos, other video files, and the like. The video display, as shown at 902 in FIG. 9, can be positioned anywhere on the device as is desired, and can be any suitable shape and size. It can provide black-and-white or color images, in any desired resolution level, including three-dimensional video. The video display, as shown at 902 in FIG. 18, can be positioned anywhere on the device as is desired, and can be any suitable shape and size. It can provide black-and-white or color images, in any desired resolution level, including three-dimensional video.

Figure 10:
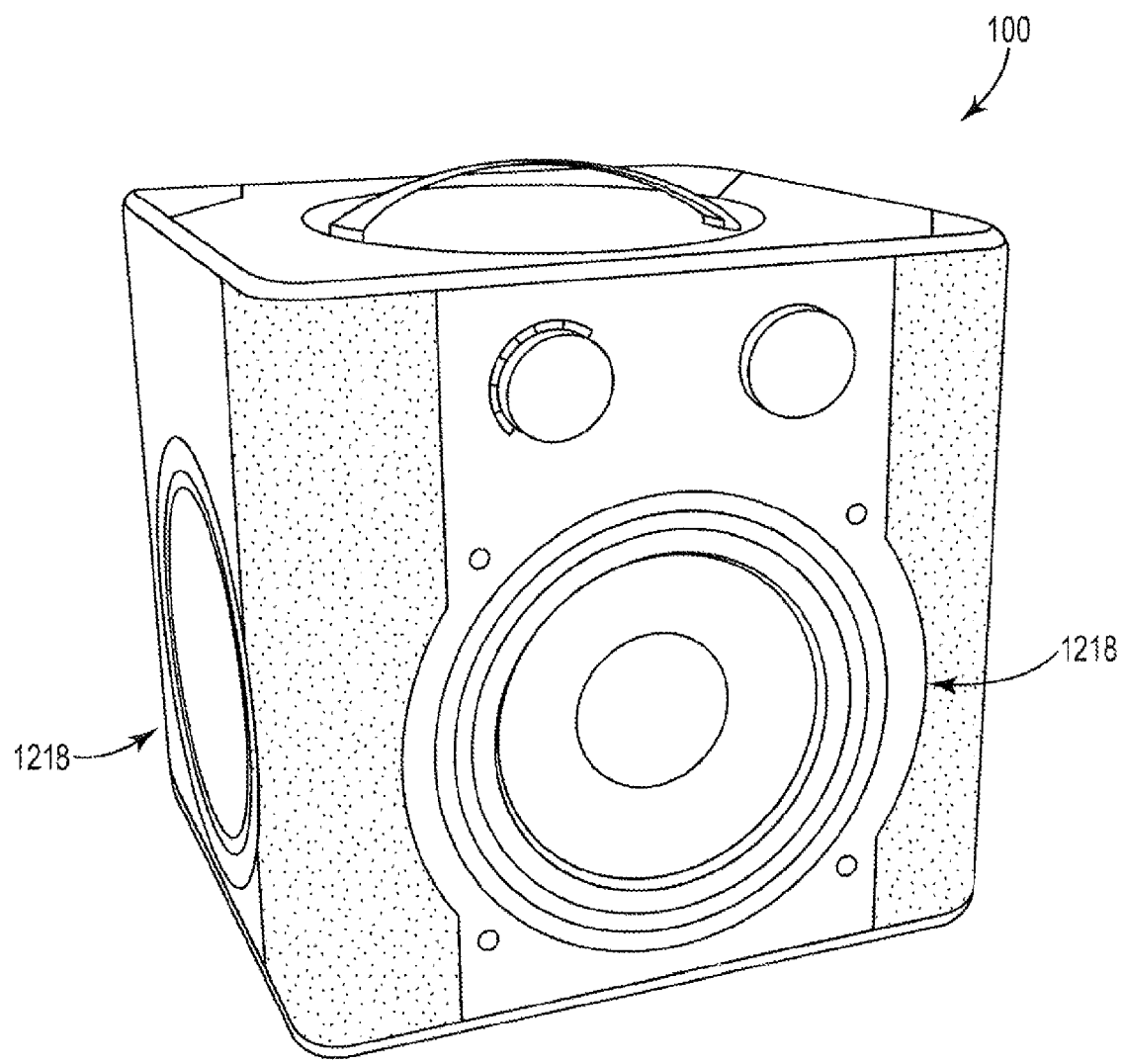
FIG. 10 is a perspective view of an audio player and speaker system according to an embodiment of the present disclosure.
Figure 17:
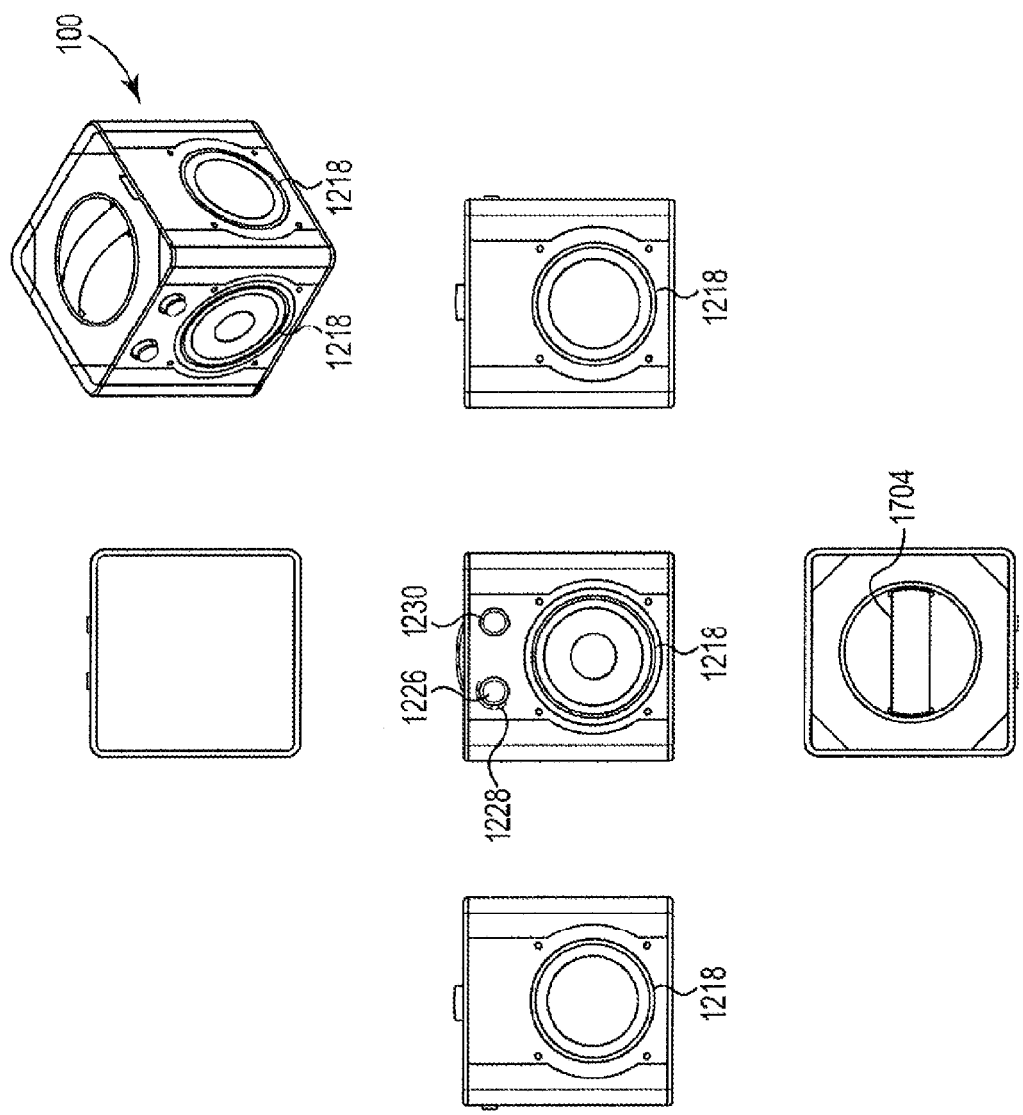
FIG. 17 includes several schematic drawings of an audio player and speaker system according to an embodiment of the present disclosure.

FIGS. 10 and 17 illustrate one embodiment of an audio player and speaker system 100 of the present disclosure. The audio player and speaker system 100 may be or include a housing configured in any suitable shape, such as but not limited to, cubical, as a rectangular polygon or rectangular prism, polygonal, triangular, spherical or semi-spherical, etc., each with any number of corners or edges that may be sharp or more smooth, rounded corners or edges. As illustrated, and in accordance with one embodiment, the audio player and speaker system 100 may be configured in substantially the shape of a cube with each side being generally dimensioned the same, and generally including softened or rounded edges and corners. In some embodiments, the audio player and speaker system 100 may be configured for indoor use only. However, it is certainly recognized that the audio player and speaker system 100 may be manufactured using water-resistant construction materials and methods and accordingly be also suitable for outdoor use.

Figure 11:
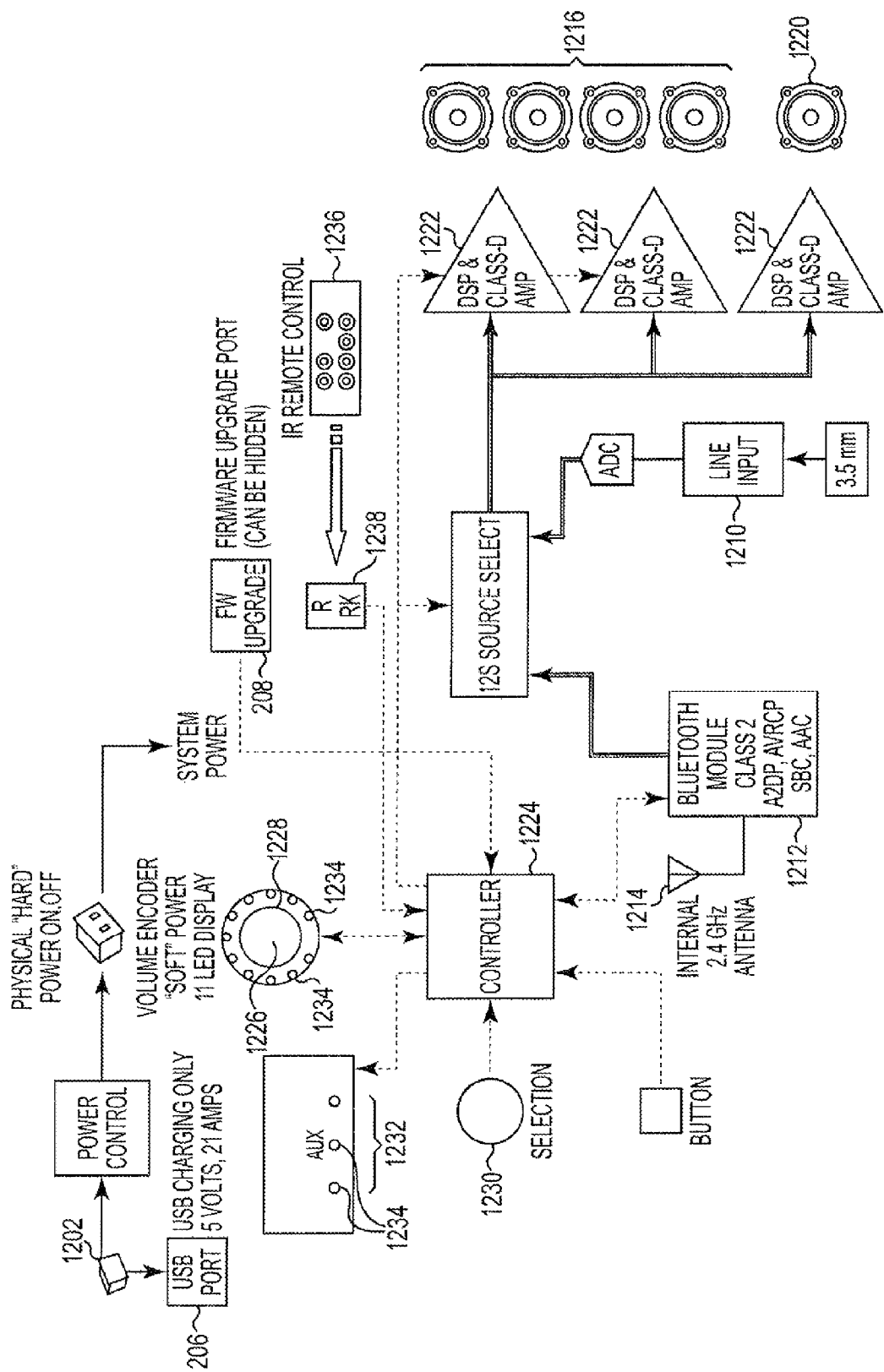
FIG. 11 is a schematic diagram of an audio player and speaker system according to an embodiment of the present disclosure.
Figure 12:
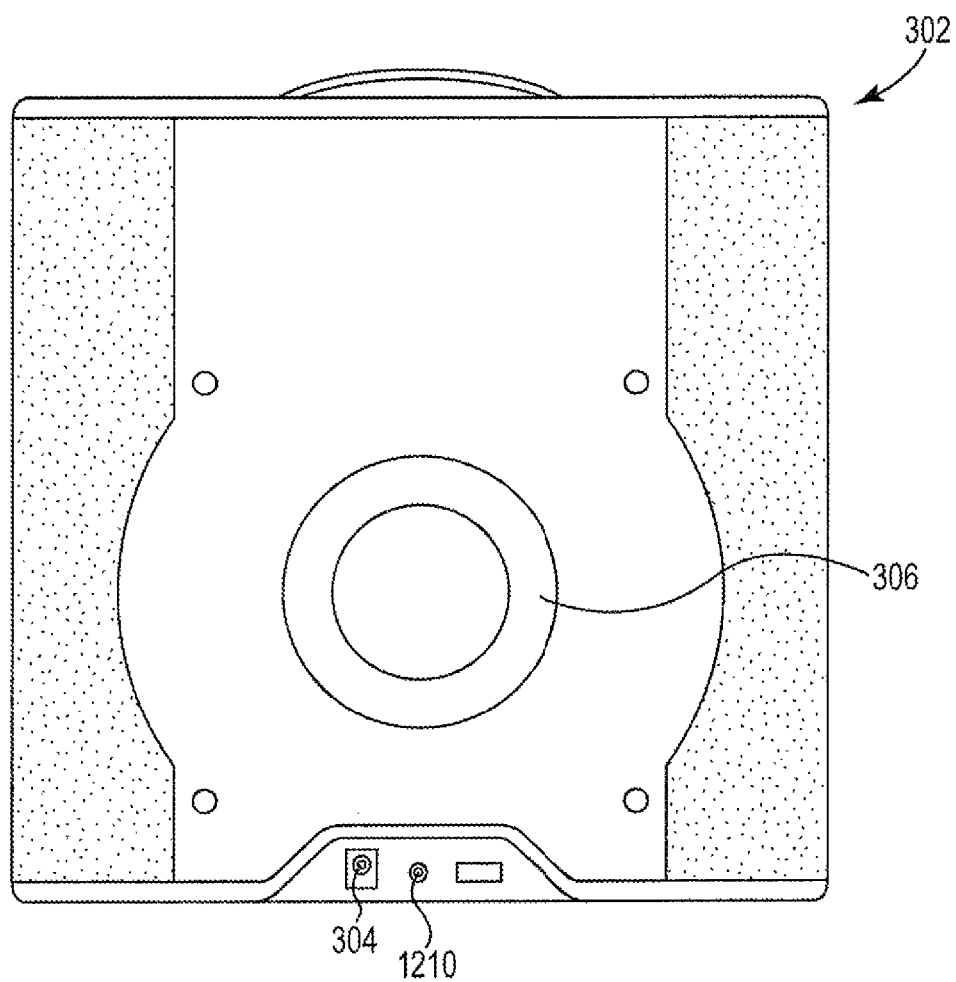
FIG. 12 is a rear panel view of an audio player and speaker system according to an embodiment of the present disclosure.

As illustrated in FIG. 11, the audio player and speaker system 100 may be removably connected to an external power source 1202, such as an AC power source for operational functions. As illustrated in FIG. 12, which shows a back panel 302 of the audio player and speaker system 100, a power adapter port 304, such as but not limited to a DC power jack, may be provided for removably connecting the audio player and speaker system via a removably connectable external power adapter to an external power source. In still other embodiments, a power cord or power adapter may be permanently or integrally connected with the audio player and speaker system 100, an opposite end of which may be connected to an external power source, such as an AC power source. In additional embodiments, the audio player and speaker system 100 may also include an internal power source, which in some embodiments, may be one or more batteries, including one or more rechargeable batteries.

In some embodiments, the audio player and speaker 100 may also include a charging port 206 for recharging an external device, such as but not limited to, a portable media player, a mobile phone or smartphone, etc. In some embodiments, as may be seen in FIG. 11, the charging port 206 may be a USB port, such as a female USB port to which the external device may be removably connected via a USB connector cord. The charging port 206 for external devices, as illustrated in FIG. 11, may be provided on or at the external power adapter. However, in additional or alternative embodiments, the charging port 206 may be provided on or at the audio player housing.

In some embodiments, the charging port 206, such as a USB port, may be additionally configured for receiving and accepting firmware updates or upgrades. In other embodiments, a separate port 208 may be used for firmware updates or upgrades, if desired.

With reference to FIGS. 11 and 12, the audio player and speaker sound system 100 may further include an auxiliary port, or line-in port, 1210 for operably connecting with an external media player to receive and play media input, such as audio input, therefrom. In one embodiment, the auxiliary port 1210 may be a standard 3.5 mm stereo jack; however, any other suitable type of port may be utilized.

In one embodiment, when the wireless communication is accomplished by Bluetooth technology, the audio player and speaker system 100 may include an internal Bluetooth receiver module 1212 and antenna 1214 for receiving media or audio data from an external media source or device having Bluetooth capabilities. The Bluetooth receiver module 1212 may be configured to perform Bluetooth pairing with the external media device, such as via secure simple pairing ("SSP"), as will be understood by those skilled in the art. Accordingly, the audio player and speaker system 100 may include a Bluetooth pairing mode, through which pairing between the Bluetooth receiver module 1212 and the external media device may be accomplished. Once the devices are paired, the devices may automatically connect when both devices are powered "on," with Bluetooth enabled, and are in Bluetooth range. In some embodiments, the audio player and speaker system 100 may include a standby mode that may monitor for nearby Bluetooth enabled devices to which it has been paired and may automatically power "on" fully when the paired device is in range. In some embodiments, where the paired device is transmitting audio, the audio player and speaker system may also automatically begin playback received from the nearby device through the Bluetooth connection.

The audio player and speaker system 100 may include any number, type, size, and placement of speakers by which to play audio received from an external (e.g., via auxiliary port 1210 or via Bluetooth) audio source and obtain a particular sound image. While not required, in one embodiment, the audio player and speaker system 100 may be configured for at least stereo sound with left, right, and optionally subwoofer channels. In other embodiments, the system could be configured for multiple sound channels and one or more subwoofer channels. In one embodiment, as shown schematically in FIGS. 11 and 13, the audio player and speaker system 100 may include four speakers/transducers/drivers 1216, with one provided at or near each upper corner 1402 of the audio player and speaker system. As indicated, the speakers 1216 may be any suitable size; however, in one embodiment, the speakers 1216 may be around 2 inches in diameter. The speakers 1216 may be utilized for any range. However, in one embodiment, speakers 1216 may be configured for a full range or a relatively higher range of frequencies. In some embodiments, the speakers 1216 may each be configured as acoustically independent in its own substantially sealed enclosure. Additionally, in some embodiments, the enclosure of each speaker 1216 may further include a passive radiator.

Figure 13:
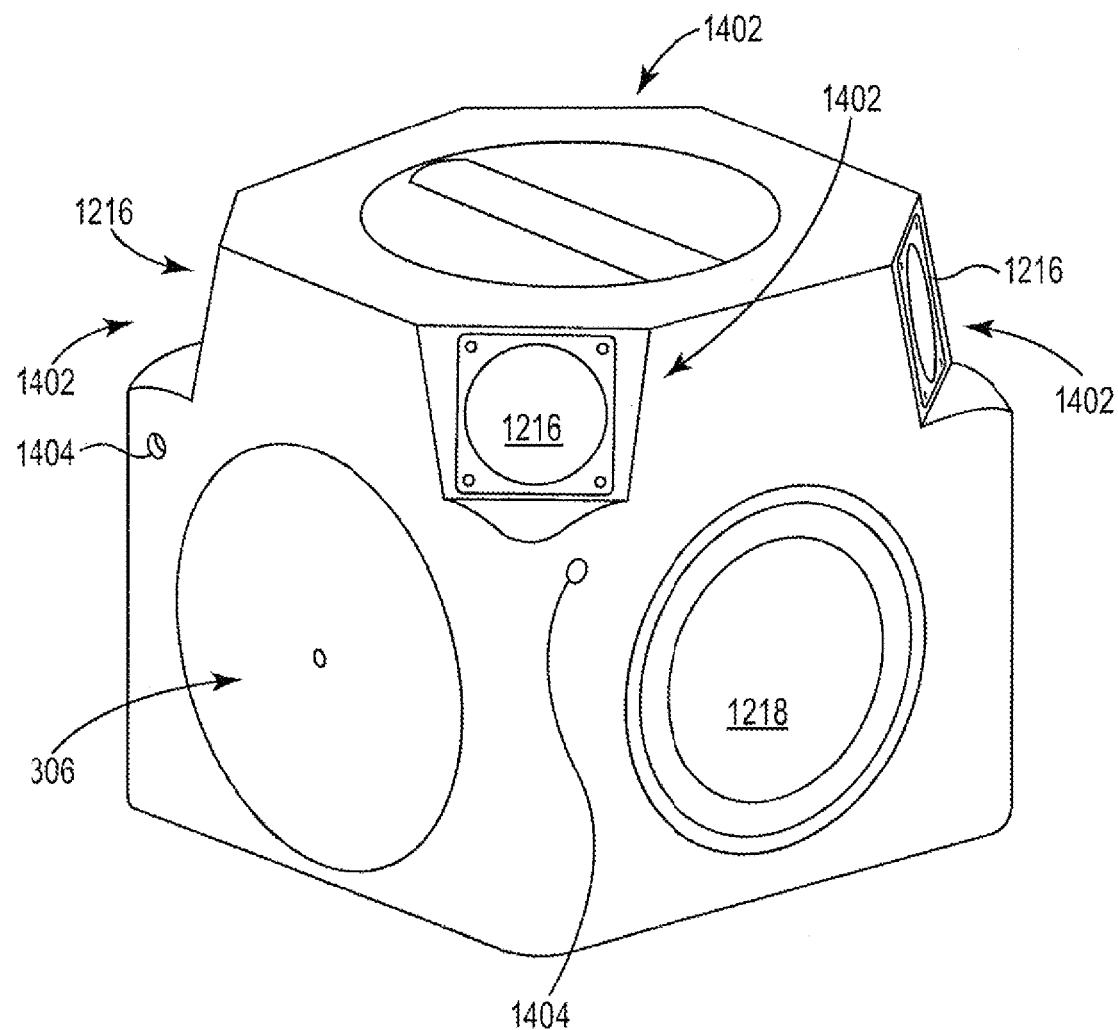
FIG. 13 is a schematic drawing of a speaker configuration for an audio player and speaker system according to an embodiment of the present disclosure.
Figure 14:
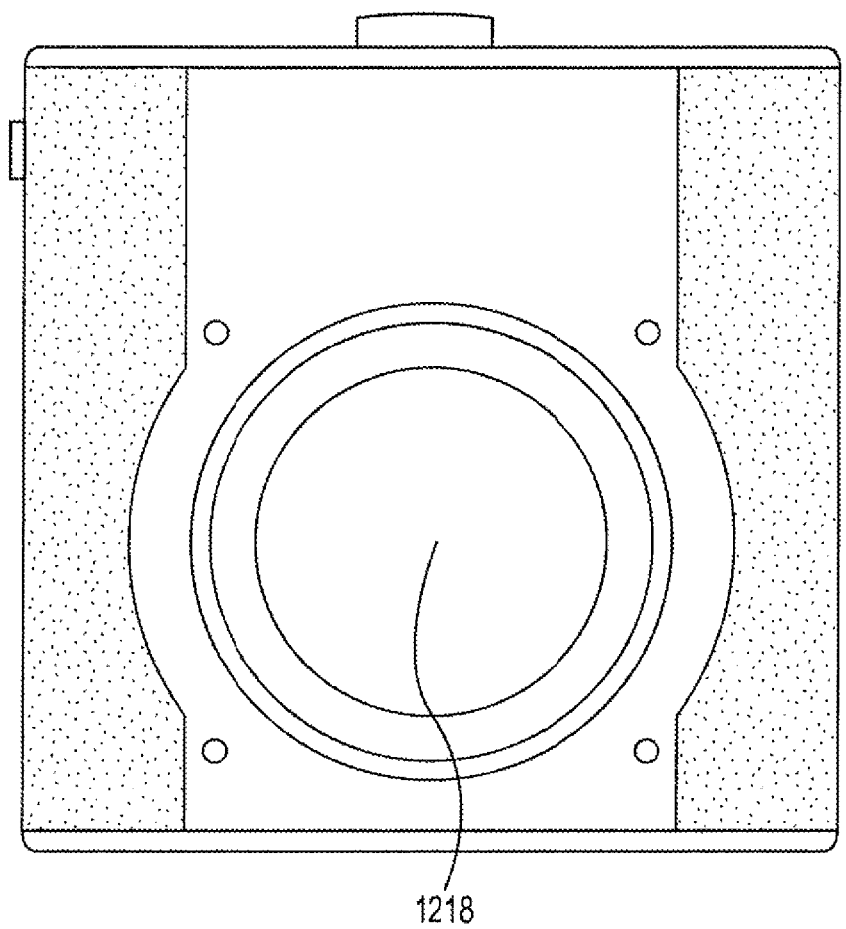
FIG. 14 is a side panel view of an audio player and speaker system according to an embodiment of the present disclosure.

In some embodiments, the audio player and speaker system 100 may include one or more relatively larger drivers/speakers or passive radiators positioned on one or more sides of the audio player and speaker system. For example, as illustrated in FIGS. 10, 13, and 14, the audio player and speaker system 100 may include a passive radiator 1218 on each of the front, left, and ride panels. As indicated, the additional speakers or passive radiators 1218 may be any suitable size; however, in one embodiment, the passive radiators 1218 may be around 5 1/4 inches in diameter. Of course, any other configuration of additional drivers/speakers or passive radiators is within the spirit and scope of the present disclosure, and may depend on the sound image desired.

The audio player and speaker system 100 may also include a larger speaker/transducer/driver 1220, which may be positioned near the bottom of the audio player and speaker system, and which may be mounted in a vented enclosure. In one embodiment, the speaker 1220 may be around 4 inches in diameter; however, other sizes are certainly suitable. The speaker 1220 may also, in some embodiments, be utilized as a subwoofer. In one embodiment, the speaker 1220 may be driving a bandpass enclosure, which may be tuned with the passive radiators and/or a reflex port/tube 306.

Although particular speaker arrangements have been discussed, as mentioned above, it is recognized that any number, type, size, and placement of speakers may be utilized as desired. Similarly, any of the speakers or passive radiators may include speaker grill covers. The system may also include any suitable number of audio reflex ports/tubes 306 for creating a desired sound image, such as additional reflex ports/tubes 1404 for speakers 1216.

The speakers may be driven utilizing any suitable number of audio amplifiers 1222. In one embodiment, in conjunction with speakers 1216 and 1220, the amplifiers 1222 may be configured to provide four full range or higher range channels and a subwoofer channel. However, it is recognized that the speakers and amplifiers may be used in any desirable configuration as desired for the application.

With reference to FIG. 11, the audio player and speaker system 100 may include a controller 1224 for controlling the functions of the audio player and speaker system 100. The controller 1224 may be a microprocessor or may be any other suitable combination of hardware or electric circuit components and/or software or software modules. A user interface or one or more controls may be provided to interface with the controller 1224 so as to direct the controller to perform a particular function.

Figure 15:
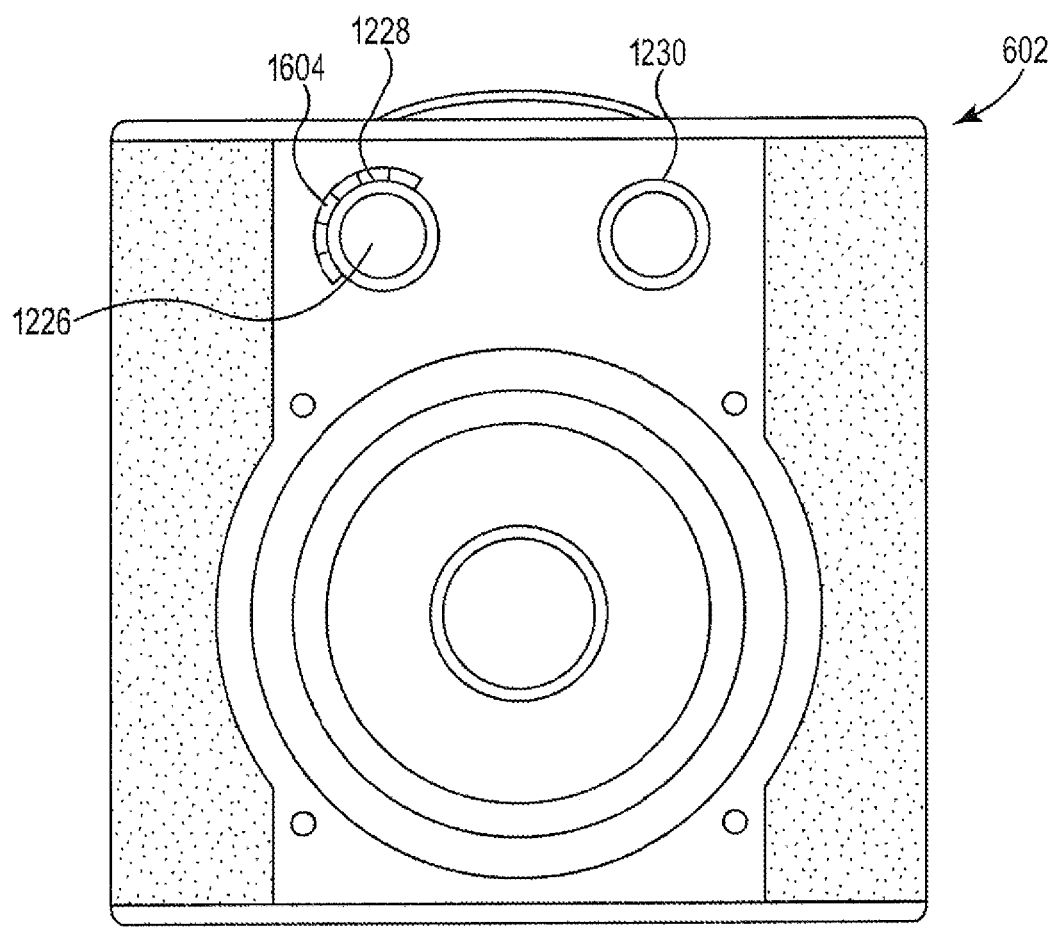
FIG. 15 is a front control panel view of an audio player and speaker system according to some embodiments of the present disclosure.

An example interface having one or more controls is illustrated in FIG. 15. However, it is recognized that any suitable interface and/or combination of controls may be utilized, and those shown in the figures are merely for illustrative purposes to assist in description of some embodiments of the present disclosure and are not intended to be limiting. As may be seen from FIG. 15, for example, a front panel 602 of the audio player and speaker system 100 may comprise one or more controls, such as buttons, dials, switches, and the like, which provide an interface through which the user may interact with the audio player and speaker system.

As illustrated in FIG. 11, the audio player and speaker system 100 may include, for example, a power button 226 or other control mechanism for powering the audio player and speaker system "on" and "off." The audio player and speaker system 100 may also include a volume control mechanism 1228 for controlling the volume level. In one embodiment, the volume control mechanism may be a volume control dial, the turning of which changes the volume. As illustrated in FIG. 15, the power button 226 and volume control dial 1228 may be the same control mechanism. However, in other embodiments, the power control and volume control could be separate. There may be any suitable number of volume levels, as may be desired. In one non-limiting embodiment, for example, there may be 32 or more discrete volume levels, and more preferably 64 or more discrete volume levels. The volume step size of each level need not be uniform. In another non-limiting embodiment, for example, there may be approximately 11 volume levels, such as volume levels of 0% (mute), 10%, 20%, 30%, 40%, 50%, 60%, 70%, 80%, 90%, 100%, or any variation thereof.

As also illustrated in FIGS. 11 and 15, for example, the audio player and speaker system 100 may include a source selector control 1230, such as but not limited to, a source selector push button or control dial, for a user to select the audio source from which the audio player and speaker system is to receive and play audio. A user may select an audio source, for example, by pressing on the source selector push button to toggle between two or more audio sources. As discussed above, in one embodiment of the audio player and speaker system 100, audio may be received and played from an external media device via auxiliary port 1210 or an external media device via wireless communication, such as but not limited to Bluetooth communication. Accordingly, in one embodiment, the source selector control 1230 may be used to toggle between audio received from the auxiliary port 1210 or via Bluetooth communication. In some embodiments, if the external source is Bluetooth enabled but has not yet been paired with the audio player and speaker system 100, the source selector may also be used to initiate pairing mode. In alternative embodiments, the audio player and speaker system 100 may have a separate control mechanism for initiating Bluetooth pairing mode.

In some embodiments, the source selector control may also operate as a speaker/tone configuration control for a user to select between sound profiles/speaker configurations and/or adjust sound/tone characteristics. A user may select between sound profiles/speaker configurations and/or adjustable sound characteristics, for example, by pressing on the source selector control 1230 push button to toggle between the sound profiles/speaker configurations and/or adjustable sound characteristics. In other embodiments, the speaker/tone configuration control could be a separate control mechanism, such as but not limited to, an additional push button or control dial.

In one non-limiting embodiment, for example, using the speaker/tone configuration control feature of the source selector control 1230, the user may be able to select between multiple sound profiles, such as a first sound profile and a second sound profile. The first sound profile may relate to a first speaker configuration, for example but not limited to, where all full range speakers 1216 are driven, providing an omni-directional sound image. The second sound profile may relate to a speaker configuration, for example but not limited to, where only some of the full range speakers 1216 are driven, or some of the full range speakers are driven at a reduced power, providing a more directed or directional sound image. Of course, any suitable number of sound profiles may be provided and each profile may relate to any suitable speaker configuration, such as but not limited to, where some or all of the speakers are driven and others are not driven or are driven at reduced power, or where the speakers are switched between mono and stereo sound.

Similarly, in one non-limiting embodiment, for example, using the speaker/tone configuration control feature of the source selector control 1230, the user may be able to select between adjustable sound characteristics. For example, the user may be able to select between treble and bass adjustment, fade adjustment, etc. Once an adjustable sound characteristic is selected, an additional control mechanism may be utilized to adjust the level of the selected sound characteristic. In one embodiment, an existing control mechanism, such as the volume control dial discussed above, may be utilized to adjust the level of the selected sound characteristic.

The audio player and speaker system 100 may also include one or more visual indicators 1232 so as to provide information to the user. The visual indicators 1230 may be provided by any suitable means, such as via one or more LEDs 1234, one or more LCD displays, etc. Such visual indicators 1232 may include, but are not limited to, any or all of the following:

Volume level indicator: an indicator may be provided to indicate the volume level of the audio player and speaker system. In one example embodiment, the indicator may include a plurality of aligned LEDs that indicate the volume level by how many of the LEDs are lit. In a further embodiment, the plurality of aligned LEDs may be aligned in circular or semi-circular fashion 1604, and may be located near or around the volume control dial discussed above. However, other suitable configurations of the visual indicator are within the spirit and scope of the present disclosure.

In one embodiment, the audio player and speaker system 100 may include a remote control 1236 for remotely controlling one or more of the above-described functions or other functions, such as but not limited to, power control, volume control, source selection, speaker/tone configuration, etc., of the audio player and speaker system, as would be understood by those skilled in the art. Accordingly, the audio player and speaker system 100 may further include a wireless receiver 1238, such as but not limited to, an infrared receiver, for receiving signals from the remote control 1236. In additional or alternative embodiments, a mobile application, often referred to as an "app," may be provided for a user to download to the external media device, such as but not limited to, a smartphone, through which the audio player and speaker system 100 may communicate and provide remote control functionality for above-described functions or other functions.

Figure 16A:
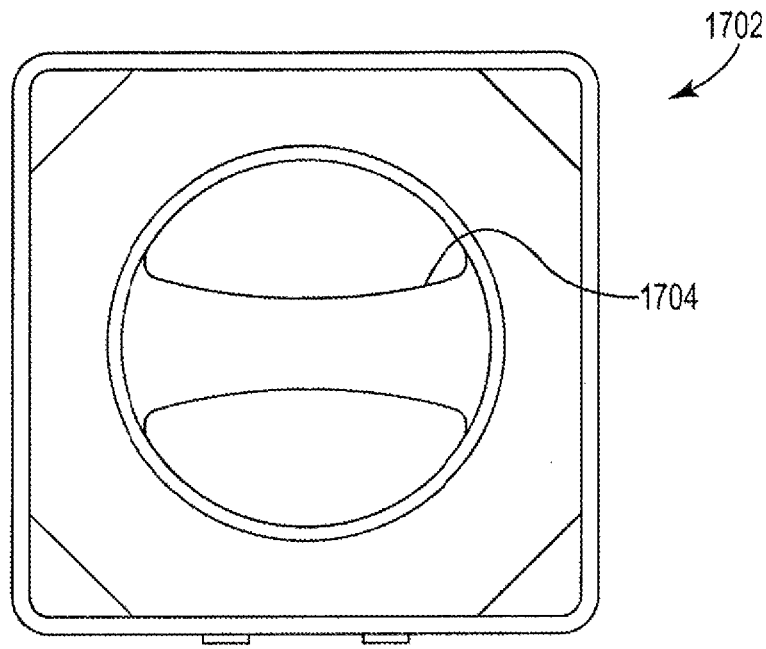
FIGS. 16A and 16B are top panel views of an audio player and speaker system according to an embodiment of the present disclosure.
Figure 16B:
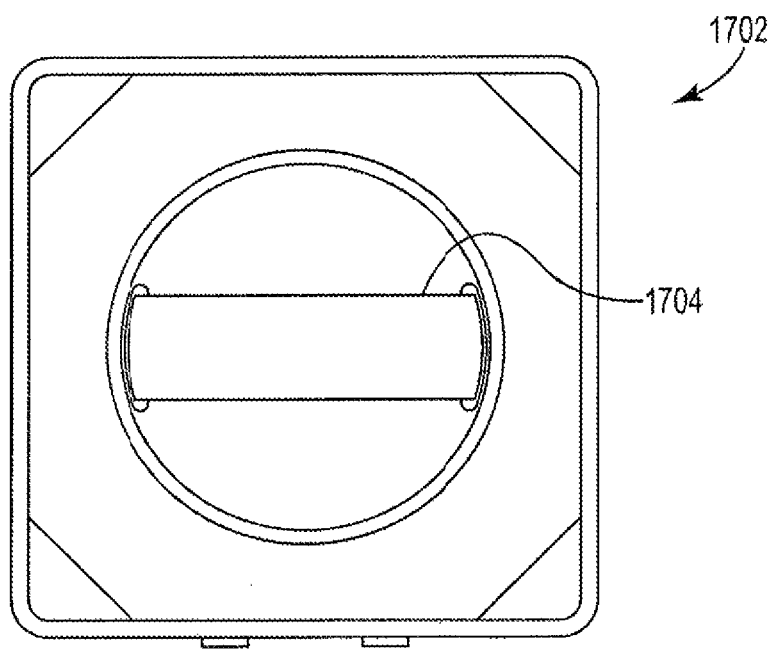

In some embodiments, as illustrated in FIGS. 16A and 16B, which show a top panel 1702, the audio player and speaker system 100 may include an integral handle 1704. The integral handle 1704 may permit the audio player and speaker system 100 to be more conveniently moveable. In some embodiments, as illustrated particularly in FIG. 16A, the integral handle 1704 may be an integral plastic handle. In other embodiments, however, such as that shown in FIG. 16B, the integral handle 1704 may be made from any suitable material, such as rubber, leather, flexible plastic, etc., or any combination thereof, and may be integrally attached to the housing of the audio player and speaker system 100.

In the foregoing description, various embodiments of the invention have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

I claim:

1. An audio playback device comprising:
   a housing having front, back, left side, right side, top, and bottom panels;
   a plurality of passive radiators or ports positioned in one or more of the front, left side, and right side panels of the housing;
   a plurality of speakers or transducers provided in the housing, the plurality of speakers or transducers configured for at least stereo sound, wherein each of the speakers or transducers is configured for a full range of frequencies or a relatively higher range of frequencies and at least one of the speakers or transducers is configured for driving a bandpass enclosure tuned with at least one of the passive radiators or ports;

a short-range, wireless communication module configured for receiving audio data from an external audio source comprising a media device, wherein the plurality of speakers or transducers is configured to play audio from the external audio source;

a controller for directing audio for playback at the plurality of speakers or transducers based on the audio data from the communication module, and to select a sound profile relating to a configuration of the speakers or transducers by which to play the audio to obtain a particular sound image;

a selector control mechanism for selecting between an omni-directional sound image in which all full range speakers or transducers are driven and a directional sound image in which only some of the full range speakers or transducers are driven or some of the full range speakers or transducers are driven at reduced power; and a wireless charging element for wirelessly recharging the external media device.

2. The audio playback device of claim 1, wherein said wireless charging element is an inductive charging element.

3. The audio playback device of claim 2, wherein said inductive charging element wirelessly charges the external media device simultaneously with receiving audio data therefrom.

4. The audio playback device of claim 1, further comprising a charging port adapted to recharge an external device.

5. The audio playback device of claim 4, wherein said charging port is a USB port.

6. The audio playback system of claim 1, further comprising a video display.

7. The audio playback device of claim 1, wherein said communication module uses Bluetooth technology.

8. The audio playback device of claim 7, further comprising a microphone.

9. The audio playback device of claim 8, wherein said device is adapted to be used as a speaker phone.

10. The audio playback device of claim 1, wherein said media device is a portable media player.

11. The audio playback device of claim 1, wherein said media device is a smartphone.

12. The audio playback device of claim 1, wherein said media device is a tablet computer.

13. The audio playback device of claim 1, wherein said media device is a personal computer.

14. The audio playback device of claim 1, further comprising a subwoofer channel.

15. The audio playback device of claim 1, wherein said device is portable.

16. A portable audio playback device comprising:

a housing having front, back, left side, right side, top, and bottom panels;

a plurality of passive radiators or ports positioned in one or more of the front, left side, and right side panels of the housing;

a plurality of speakers or transducers provided in the housing, the plurality of speakers or transducers configured for at least stereo sound, wherein each of the speakers or transducers is configured for a full range of frequencies or a relatively higher range of frequencies and at least one of the speakers or transducers is configured for driving a bandpass enclosure tuned with at least one of the passive radiators or ports;

a short-range, wireless communication module configured for receiving audio data from an external audio source comprising a media device, wherein the plurality of speakers or transducers is configured to play audio from the external audio source;

a controller for directing audio for playback at the plurality of speakers or transducers based on the audio data from the communication module, and to select a sound profile relating to a configuration of the speakers or transducers by which to play the audio to obtain a particular sound image;

a selector control mechanism for selecting between an omni-directional sound image in which all full range speakers or transducers are driven and a directional sound image in which only some of the full range speakers or transducers are driven or some of the full range speakers or transducers are driven at reduced power; and a wireless inductive charging element for wirelessly recharging the external media device.

17. The portable audio playback device of claim 16, wherein the wireless inductive charging element is configured to wirelessly charge the external media device while simultaneously receiving audio data therefrom.

18. The portable audio playback device of claim 16, further comprising a USB charging port adapted to recharge an external device.

19. The portable audio playback device of claim 16, further comprising a video display.

20. The portable audio playback device of claim 16, further comprising a microphone, wherein the communication module uses Bluetooth technology and the device is adapted to be used as a speaker phone.

* * * * *